United States Patent
Suggs et al.

(10) Patent No.: US 6,984,117 B1
(45) Date of Patent: Jan. 10, 2006

(54) APPARATUS AND METHOD FOR MANUFACTURING GASKETS

(75) Inventors: Steven M. Suggs, Nacogdoches, TX (US); Reid M. Meyer, Nacogdoches, TX (US)

(73) Assignee: Acadia Elastomers Corporation, Nacogdoches, TX (US)

( * ) Notice: Subject to any disclaimer, the term of this patent is extended or adjusted under 35 U.S.C. 154(b) by 0 days.

(21) Appl. No.: 10/392,732

(22) Filed: Mar. 18, 2003

Related U.S. Application Data

(62) Division of application No. 09/119,984, filed on Jul. 21, 1998, now Pat. No. 6,540,852.

(51) Int. Cl.
B29B 9/10 (2006.01)

(52) U.S. Cl. .................... 425/80.1; 425/355; 425/408; 425/416

(58) Field of Classification Search .............. 425/80.1, 425/352–355, 406–408, 412, 416, DIG. 40
See application file for complete search history.

(56) References Cited

U.S. PATENT DOCUMENTS

| | | | |
|---|---|---|---|
| 1,030,055 A | 6/1912 | Darlington, Jr. | |
| 3,103,698 A | 9/1963 | Wollet | 18/5 |
| 3,165,570 A | 1/1965 | Deutsch | 264/329 |
| 3,338,999 A | 8/1967 | Knapp | 264/113 |
| 3,404,061 A | 10/1968 | Shane et al. | 161/102 |
| 3,697,208 A * | 10/1972 | Munk et al. | 425/80.1 |
| 4,000,231 A | 12/1976 | Peterson | 264/40.2 |
| 4,084,929 A | 4/1978 | McGarry, Sr. et al. | 425/169 |
| 4,162,078 A | 7/1979 | Cox | 277/102 |
| 4,190,257 A | 2/1980 | Schnitzler | 277/102 |
| 4,422,894 A | 12/1983 | Atkinson | 156/62.2 |
| 4,435,235 A | 3/1984 | Atkinson et al. | 156/62.2 |
| 4,455,334 A | 6/1984 | Ogino et al. | 428/36 |
| 4,463,959 A | 8/1984 | Usher et al. | 277/230 |
| 4,556,090 A | 12/1985 | Pujari | 141/59 |
| 4,761,264 A | 8/1988 | Nishio et al. | 419/68 |

(Continued)

FOREIGN PATENT DOCUMENTS

DE 3309341 6/1984

(Continued)

OTHER PUBLICATIONS

Supplemental European Search Report; Application NO. EP 99 93 2996.

*Primary Examiner*—Robert Davis
*Assistant Examiner*—Thu Khanh T. Nguyen
(74) *Attorney, Agent, or Firm*—Baker, Donelson, Bearman, Caldwell & Berkowitz

(57) ABSTRACT

An apparatus and methods of manufacturing seamless gaskets using expanded intercalated graphite worms, in which an annular die cavity has a central column with a charge inlet in a perimeter wall. Expanded intercalated graphite worms communicate from a source through the charge inlet in the annular die cavity for depositing a charge of expanded intercalated graphite worms within the die cavity. An upper pusher is movable from a first position distally spaced from an open end of the die cavity to a second position within the die cavity for compressing a first charge of expanded intercalated graphite worms. A lower pusher is movable from a first position to a second position during the compressing of the first charge of expanded intercalated graphite worms in the die. The upper pusher causes the lower pusher to move to the second position, so that a second charge of expanded intercalated graphite worms is received in substantially the same volume as the first charge. The upper pusher then compresses the second charge to form a seamless gasket.

19 Claims, 4 Drawing Sheets

U.S. PATENT DOCUMENTS

| | | | |
|---|---|---|---|
| 4,770,833 A | 9/1988 | Hughes | 264/120 |
| 4,789,323 A | 12/1988 | Hudson | 425/352 |
| 5,569,425 A * | 10/1996 | Gill et al. | 425/416 |
| 5,570,501 A | 11/1996 | Atkinson | 29/572.2 |
| 5,785,322 A | 7/1998 | Suggs et al. | 277/207 A |
| 5,797,982 A | 8/1998 | Suggs et al. | 118/304 |
| 6,096,249 A * | 8/2000 | Yamaguchi | 264/40.3 |
| 6,241,935 B1 * | 6/2001 | Beane et al. | 425/425 |
| 6,540,852 B1 | 4/2003 | Suggs et al. | 156/62.2 |

FOREIGN PATENT DOCUMENTS

| | | |
|---|---|---|
| JP | 62-064499 | 3/1987 |
| WO | WO 97/45660 | 12/1997 |

\* cited by examiner

APPARATUS AND METHOD FOR MANUFACTURING GASKETS

This application is a divisional of Ser. No. 09/119,984, filed Jul. 21, 1998, now U.S. Pat. No. 6,540,852.

TECHNICAL FIELD

The present application relates to gasket manufacturing apparatus and processes. More particularly, the present invention is directed to apparatus and methods for volumetric molding and manufacturing of seamless gaskets.

BACKGROUND OF THE INVENTION

Graphite has long been recognized as a material which exhibits superior quality for sealing and gasket applications. These characteristics include high thermal stability, low thermal conductivity, natural lubricity, resistance to chemical degradation, conformability, and resilience.

Graphite has typically been provided in the form of calendared sheets made with expanded intercalated flake graphite worms. Intercalated flake graphite is made by treating natural or synthetic graphite flakes with an intercalating agent such as fuming nitric acid, fuming sulfuric acid, or mixtures of concentrated nitric acid and sulfuric acid. The intercalated flake graphite is then expanded at high temperatures to form a low-density, worm-like form of particulate graphite having typically an 80–100 fold increase in size over the flake raw material. U.S. Pat. No. 3,404,061 describes the production of intercalated flake graphite as an intermediate step in the production of expanded intercalated graphite. Expanded intercalated graphite worms have thin structural wall and are light-weight, puffy, airy, and elongated bodies.

These characteristics lead to exceedingly difficult volumetric, handling, and use problems. Because of these characteristics, expanded intercalated graphite worms typically are calendared to produce sheets of graphite. Calendared graphite is commercially available as GRAFOIL brand sheets. The sheets have a uniform density and a uniform thickness. The sheets are generally available in several standard thickness and densities. The sheet is die-cut to form a gasket. To provide increased tensile strength, a layer of mylar adhesive is applied to one surface of the sheet. The mylar allows the gasket to be applied to an annular metal disk. Gaskets manufactured with calendared graphite sheet typically are used for sealing purposes in high pressure, high temperature fluid flow applications. While such gaskets perform sealing functions, there are drawbacks to their use. Cut calendared graphite sheet particularly provides open edges which is susceptible to high pressure attack from the fluids being sealed by the gasket.

Further, the expanded intercalate graphite worms are extremely light and puffy. A significantly large volume of the worms is required to produce a relatively thin layer of gasket material. There is an approximate 100 to 1 ratio between the volume of expanded worms and compressed worms. The worms being extremely lightweight, are difficult to handle. The slightest air current quickly stirs up the worms. Accordingly, expanded intercalated graphite typically was calendared to form graphite sheets.

U.S. Pat. No. 5,785,322 describes the use of the expanded intercalated graphite worms in forming a seamless gasket for high pressure, high temperature fluid flow applications. Gaskets of this type have superior performance without the drawbacks of conventional sheet-formed gaskets. The manufacture of these improved gaskets however is difficult, expensive, and labor intensive. The manufacturing problems arise from the characteristics of expanded intercalated graphite worms discussed above. The manufacturing process involves manually loading a die with expanded intercalated graphite worms, which are then compressed with a hydraulic press. A significant amount of worms must be loaded in the die, because of the high expansion volume of the worms. A typical ⅛ inch thick gasket requires between 10 and 12 inches of expanded intercalated graphite worms. Yet the mass of the worms is small, and typical gaskets have about a gram of worms on the opposing sides.

While the resulting gasket exhibits superior sealing performance, air may be entrained in the gasket or some portions may have differing densities due to the movement or uneven provision of worms to the die.

Accordingly, there remains a need in the art for an apparatus and method for manufacturing seamless gaskets with lightweight expanded materials. It is to such that the present invention is directed.

BRIEF DESCRIPTION OF THE PRESENT INVENTION

The present invention provides an apparatus and method for manufacturing seamless gaskets using expanded materials. More particularly described, the present invention provides an apparatus and methods of manufacturing seamless gaskets using expanded intercalated graphite worms, in which an annular die cavity has a central column with a charge inlet in a perimeter wall. Expanded intercalated graphite worms communicate from a source through the charge inlet in the annular die cavity for depositing a charge of expanded intercalated graphite worms within the die cavity. An upper pusher is movable from a first position distally spaced from an open end of the die cavity to a second position within the die cavity for compressing a first charge of expanded intercalated graphite worms. A lower pusher is movable from a first position to a second position during the compressing of the first charge of expanded intercalated graphite worms in the die. The upper pusher causes the lower pusher to move to the second position, so that a second charge of expanded intercalated graphite worms is received in substantially the same volume as the first charge. The upper pusher then compresses the second charge to form a seamless gasket.

The method of the present invention communicates a volumetric first charge of expanded intercalated graphite worms to a die cavity. An upper pusher moves to compress the expanded intercalated graphite worms while moving a lower pusher in the die cavity from a first position to a second position. A second volumetric charge of expanded intercalated graphite worms is communicated to the die cavity. Moving the lower pusher to the second position provides a cavity for the second charge that has substantially the same volume as for the first charge. The second charge is also compressed with the upper pusher to form a seamless gasket. The seamless gasket is then removed from the die cavity and the lower pusher is reset to its first position. More particularly described, the worms are communicated by low pressure air in which the worms become partially compressed as they travel to and are distributed in the die.

Objects, features, and advantages of the present invention will become apparent from a reading of the following detailed description of the invention and claims in view of the appended drawings.

DETAILED DESCRIPTION OF THE PREFERRED EMBODIMENTS

Figure 1:
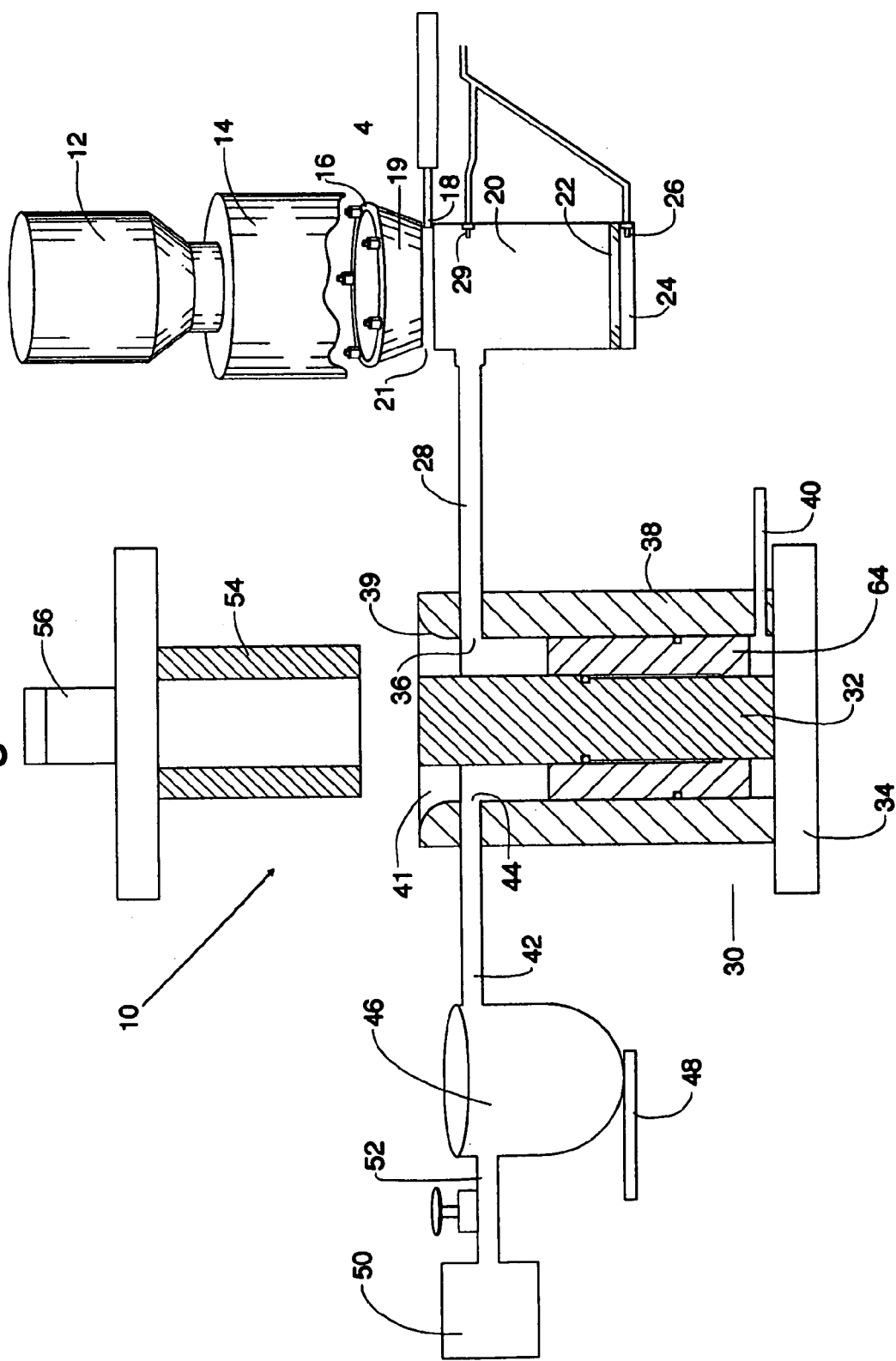
FIG. 1 illustrates a schematic view of an apparatus according to the present invention for manufacturing seamless gaskets.
Figure 5:
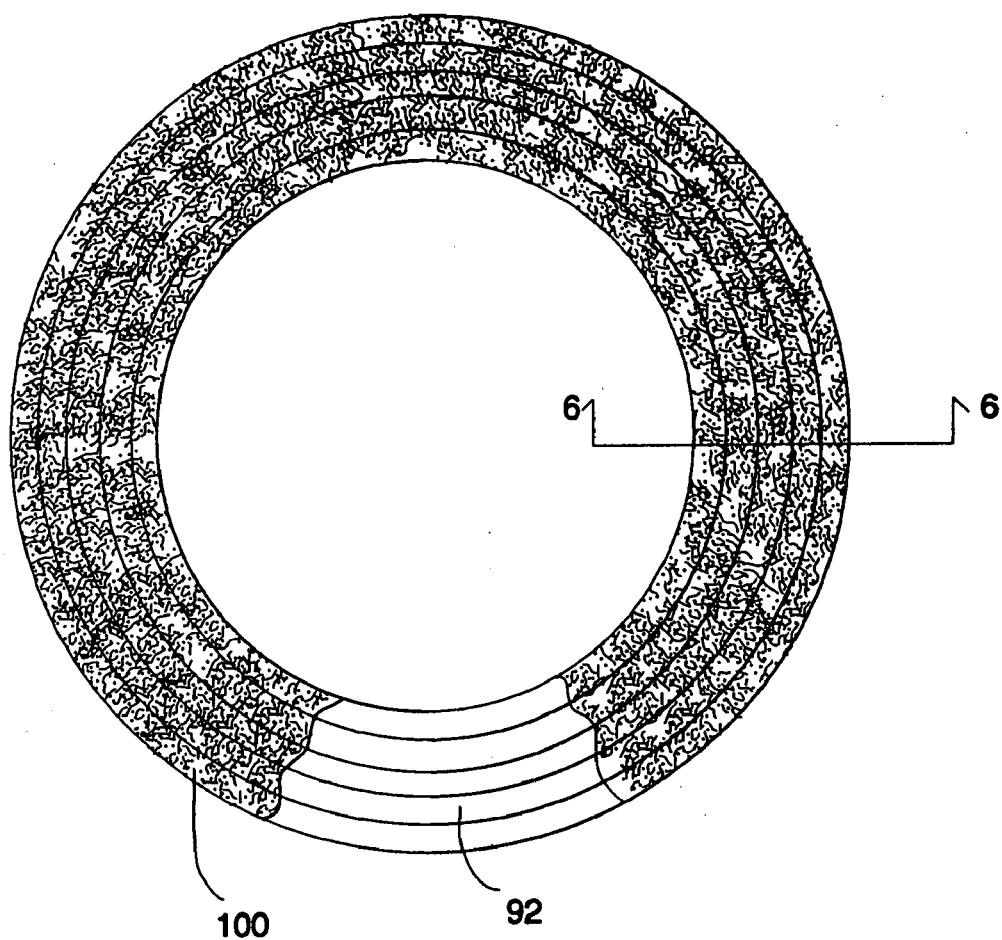
FIG. 5 illustrates a seamless gasket manufactured with the apparatus shown in FIG. 1.

Referring now in more detail to the drawings, in which like numerals indicate like parts throughout the several views FIG. 1 illustrates a schematic view of an apparatus 10 according to the present invention for manufacturing seamless gaskets 11 as shown in FIG. 5. The apparatus 10 includes a supply hopper 12 which receives a supply of expanded intercalated graphite worms. The hopper 12 communicates the worms to a staging chamber 14. A plurality of air nozzles 16 are disposed around a lower portion of the staging chamber 14. The air nozzles 16 communicate with a supply of low pressure air (not illustrated). A knife gate valve 18 is attached at a discharge opening 19 of the staging chamber 14. The knife gate valve 18 is selectively operable from an open position to a closed position for discharging worms from the staging chamber 14 to a supply plenum 20. The staging chamber 14 defines an opening 21 in a side wall opposite the knife gate valve 18. The opening 21 allows a portion of the expanded intercalated graphite worms, pushed by the knife gate valve 18 during operation of the apparatus 10, to exit the staging chamber 14 in order to avoid a buildup of compressed-worms in the supply plenum 20. A lower surface of the supply plenum 20 is defined by an air permeable screen 22. The screen 22 separates the supply plenum 20 from an air chamber 24. The screen 22 is substantially impermeable to the expanded intercalated graphite worms. An air nozzle 26 mounts in the air chamber 24 and communicates with a supply of pressurized air. A conduit 28 attaches to a discharge in an upper portion of the supply plenum 20. A second air nozzle 29 attaches to the side wall opposite the conduit 28, and communicates with a source of pressurized air.

The conduit 28 communicates with an annular die generally 30 which has a central column 32 extending from a base plate 34. The conduit 28 connects to an inlet 36 in a perimeter wall 38 of the annular die 30. A distal edge of the perimeter wall 38 defines a beveled face 39 at an open end 41 of the die 30. A bore 40 is defined in the perimeter wall 38 for communicating pressurized air into a lower portion of the cavity of the die 30, for a purpose discussed below. In the illustrated embodiment, a conduit 42 connects between an exit port 44 in the perimeter wall 38 and a filter chamber 46 having a discharge opening 48. A pump 50 connects through a valve-controlled conduit 52 to the filter chamber 46.

An upper pusher 54, defined by an annular die, connects to a cylinder rod 56 of a hydraulic cylinder (not illustrated) for moving the die pusher 54 from a first position distally spaced from the open end 41 of the annular die 30 to a second position with the annular die 56 received within the annular cavity of the die 30. The die 30 includes a lower pusher 64 which is movable within the cavity of the die 30.

Figure 2:
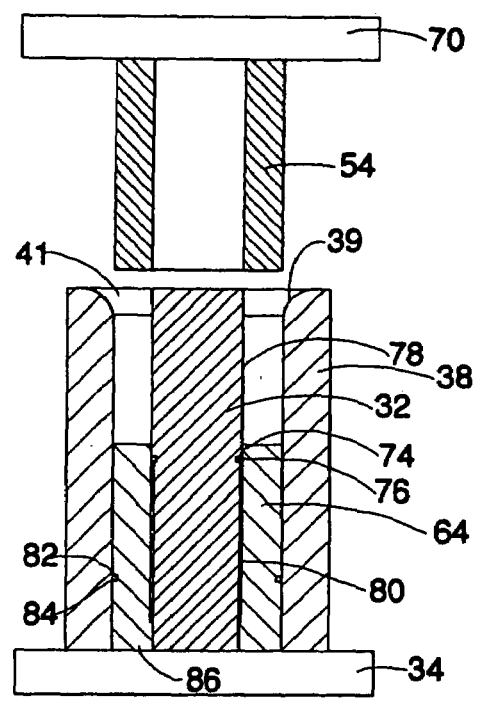
FIG. 2 is a cross-sectional view of the die for forming a seamless gasket using in the apparatus illustrated in FIG. 1.
Figure 3:
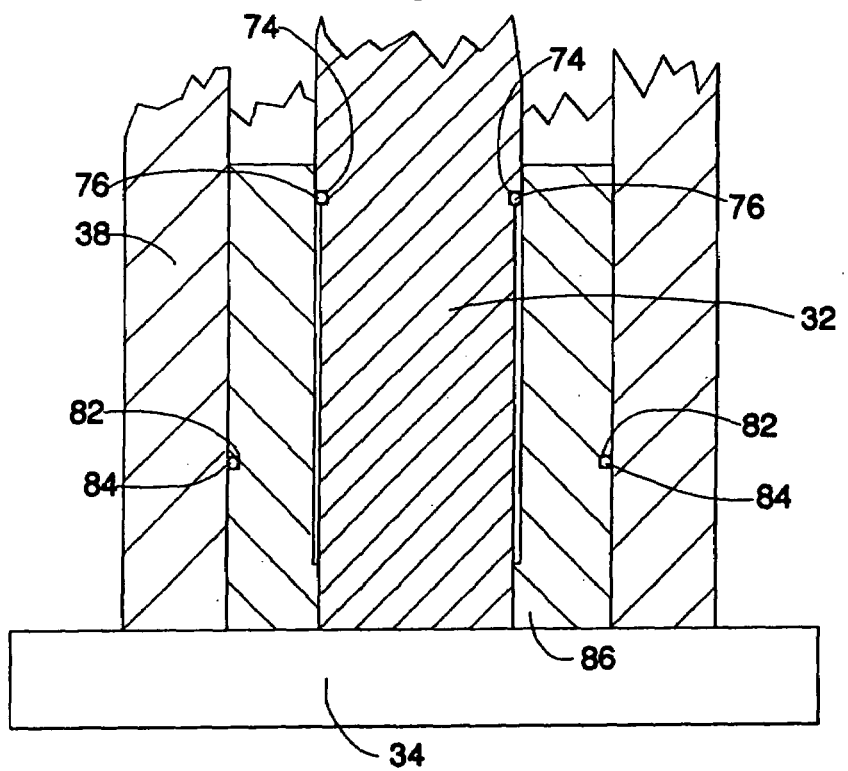
FIG. 3 is a detailed cross-sectional view of the die illustrated in FIG. 2.

The die 30 is best illustrated in cross-sectional view in. FIG. 2, and FIG. 3 illustrates an detailed cross-sectional view of the lower pusher 64 and the central column 32 of the die 30. The upper pusher 54 comprises an annular cylinder attached to a die plate 70. The die wall 38 is defined by an annular cylinder attached to the die plate 34'. The lower pusher 64 comprises an annular cylinder received around the central column 32. The central column 32 defines an annular groove 74 which receives an O-ring 76. The groove 74 defines a boundary between an upper portion 78 and a lower portion 80. The diameter of the lower portion 80 is slightly smaller than that of the upper portion 79.

The lower pusher 64 defines an annular groove 82 in a outer surface, which groove receives an O-ring 84. A flange 86 extends laterally from a bottom edge of an inner surface of the lower pusher 64. The O-ring 76 on the central column 32 acts as a stop when contacted by the flange 86 during movement of the lower pusher 64 as discussed below.

FIGS. 4A–4E is a sequence of cross-sectional views of the die 30, illustrating steps in the manufacture of a seamless gasket according to the present invention.

The apparatus 10 provides volumetric molding of seamless gaskets with light-weight materials communicated to the die 30 by a low pressure air flow. A plurality of expanded intercalated graphite worms are provided to the hopper 12. The expanded intercalated graphite worms are delivered from a supply to the hopper. Although not illustrated, a vacuum cleaner is used to periodically communicate worms into the hopper from a supply. In alternate embodiment, the hopper receives a continuous supply from an expander which expands intercalated graphite flakes as needed for use in the apparatus 10.

Periodically, the hopper 12 drops a portion of the expanded intercalated graphite worms to the staging chamber 14. The air nozzles 16 direct air from the low pressure supply upwardly into the cavity of the staging chamber 14. This air flow causes the worms to swirl and prevents the worms from clumping together. The worms fall past the air nozzles 16 to the knife gate valve 18. The knife gate valve 18 selectively opens to discharge a predetermined quantity of the worms from the staging chamber 14 into the supply plenum 20. The knife gate valve 18 moves between the first position closing communication between the staging chamber 14 and the supply plenum 20 to the second position allowing communication therebetween. As the knife gate valve 18 closes, a portion of the expanded intercalated graphite worms are pushed by the leading edge of the valve through the opening 21. This prevents the worms from being compressed and clumping in the supply plenum 20.

The air nozzle 26 communicates low pressure air into the air chamber 24 to provide an updraft of air through the air permeable screen 22 into the supply plenum 20. The air causes the worms to remain loosely together in the supply plenum 20. The flow of air carries the charge of worms from the supply plenum 20 through the conduit 28 into the annular die 30 where the worms are deposited around the annular cavity of the die 30. The pressure of the air in the air plenum is between about 5 and 30 pounds per square inch. The flow of the worms into the conduit 28 is facilitated by the second nozzle 29 that communicates low pressure air towards the conduit. The air flow partially compresses the worms as they are carried through the conduit 28 and are deposited in the die 30. Partial compression of the worms being placed in the die 30 enables the die cavity 30 to be smaller than the manually loaded dies used in the prior art. Smaller dies enables the stroke of the upper pusher to be shorter, which results in faster processing time. The smaller dies also are less expensive to manufacture.

The illustrated embodiment further includes an alternate embodiment using a low pressure vacuum to facilitate communication of the worms. Operation of the pump 50 provides a low pressure vacuum to the cavity of the annular die 30 through the conduit 42, as controlled by the valve 52. The low pressure vacuum facilitates pulling the worms into the annular cavity of the die 30 while the worms are also being pushed by low pressure air from the plenum 20 through the conduit 28 into the die 30. The low pressure air flow through the die 30 permits most of the worms to be distributed uniformly within the cavity. A portion of the worms are carried through the conduit 42 into the filter chamber 46. The filter chamber 46 allows the residual worms to settle towards the discharge 48. Periodically the discharge 48 is opened to remove the accumulated residual worms.

Figure 4A:
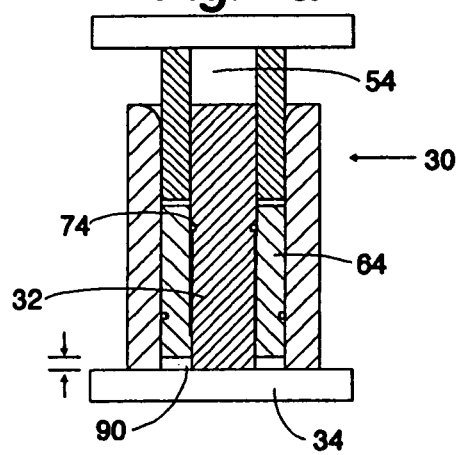
FIGS. 4A–4E is a sequence of cross-sectional views of the die shown in FIG. 2, illustrating steps in the manufacture of a seamless gasket according to the present invention.

The sequence of operational steps in the volumetric molding process in the manufacture of a seamless gasket according to the present invention is illustrated in FIGS. 4A–4E, together with reference to FIG. 1. As shown in FIG. 4A, the upper pusher 54 is moved from the first position to a second position in the die 30 to move the lower pusher 64 to a first position while leaving a gap 90 between the die plate 34 and a bottom surface of the lower pusher. The gap 90 equals the thickness of a metal insert 92 and the compressed worms 94 on one side of the gasket made with the apparatus.

Figure 4B:
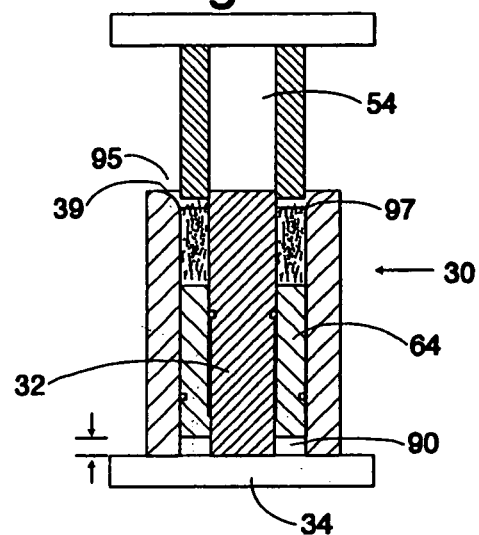

With reference to FIG. 4B, the upper pusher 54 is retracted to a third position with a lower edge in the open end 60 of the die while leaving a gap 95 between the upper pusher and the beveled face 39. The gap 95 permits air to escape from the die 30 during charging with the expanded intercalated graphite worms. The supply plenum 20 is then provided with a first charge 97 of expanded intercalated graphite worms by operation of the knife blade gate 18. The charge of worms enters the air plenum 20 and the worms are carried by the air flow from the nozzles 26 and 29 through the conduit 28 into the die 30 while being partially compressed. The air escapes through the gap 95, and a small portion of the worms are carried out of the die 30 through the gap. In the illustrated embodiment, both the air flow and the vacuum from the pump 50 facilitate substantially uniform distribution of the worms throughout the cavity of the die 30, although the air flow from the nozzles 26 and 29 sufficiently communicate the worms and distribute them in the die 30. The die 30 is now filled with expanded intercalated worms.

Figure 4C:
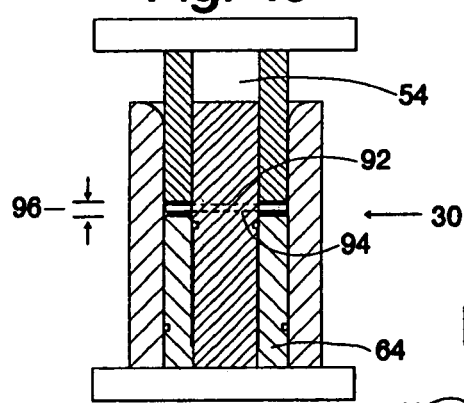

The upper pusher 54 is then retracted from the die 30 to its first position. An annular insert 92, preferably metal, is then placed on the charge 97 of worms in the die 30. With reference to FIG. 4C, the first charge 97 of the worms is then compressed by the pusher 54 moving from the first position to the second position. This brings the lower surface of the upper pusher 54 into contact with the insert 92. Continued movement of the upper pusher 54 compresses the charge 97 of worms against the insert 92. The upper pusher 54 also causes the lower pusher 64 to move in the die chamber from the first position to a second position bottoming against the die plate 34 and closing the gap 90. The combined thickness 96 of the layer of compressed worms 94 and the insert 92 substantially equals the gap height of the 90, shown in FIG. 4A.

Figure 4D:
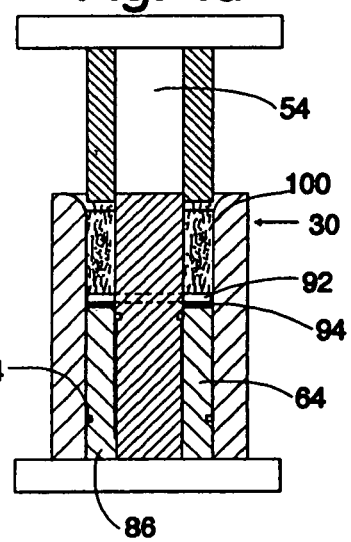
Figure 4E:
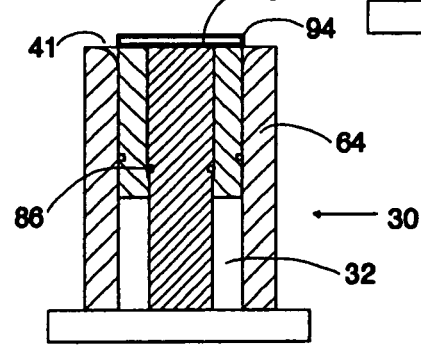

With reference to FIG. 4D, the upper pusher 54 is then retracted to the third position in the open end 60 of the die 30 to leave the gap 95. The die 30 is provided with a second charge 100 of expanded intercalated graphite worms. The volume of the cavity receiving the second charge 100 is substantially the same volume as received the first charge 97, because of the displacement of the lower pusher 64 to the second position to the bottom of the die 30. The upper-pusher 54 moves again from the third position to the second position for compressing the second charge 100 of worms against the insert 92. To assure compaction of the worms in the first charge 97 and the second charge 100, the hydraulic cylinder moves the upper pusher 54 forcibly against the worms and the insert 92 several times. Further, in an alternate embodiment, a burst of low pressure air communicated through the opening 36 may tend to bounce or disturb the worms in the cavity, whereby entrained air may be dislodged. This process described with reference to FIG. 1 and FIGS. 4A–4E, results in a substantially seamless gasket 11 being manufactured with the apparatus 10.

The gasket 11 is then removed. This is accomplished by retracting the upper pusher 54 to the first position while air is communicated through the bore 40 into the lower portion of the die 30. The air enters below the O-ring 84 which seals the air from passage between the lower pusher 64 and the wall 38. The increased air pressure causes the lower pusher 64 to move within the die 30 towards the open end 60. The flange 84 comes into contact with the O-ring 76 which stops the movement of the lower pusher 64. The newly formed seamless gasket 11 is disposed at the open end 41 of the die 30, where it is readily removed. The cycle is then repeated for manufacturing additional seamless gaskets.

Figure 6:
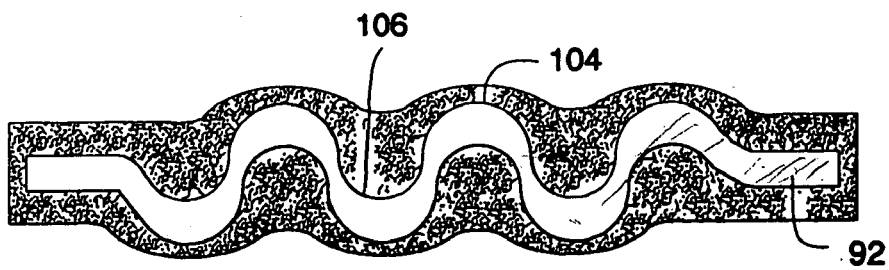
FIG. 6 illustrates a cross-sectional view of the gasket of FIG. 5, taken along line 6—6.

FIG. 5 illustrates a cut-away view of the gasket 0.11 formed with the apparatus 10 according to the present invention. The gasket 11 has an outer diameter perimeter edge 101 and an inner diameter perimeter edge 103. The gasket 11 includes the metal insert 92 which is coated with the worms in the charges 97 and 100. FIG. 6 is a cross-sectional view taken along line 6—6 of FIG. 5. The preferred embodiment uses a metal insert 92 having corrugations which define a series of ridges 104 and valleys 106 which are filled with the compacted worms from the charges 97 and 100.

The present invention accordingly provides a volumetric molding process for light-weight materials to form seamless gaskets. The principles, preferred embodiments, and modes of operation of the present invention have been described in the foregoing specification. The invention is not to be construed as limited to the particular forms disclosed because these are regarded as illustrative rather than restrictive. Moreover, variations and changes may be made by those skilled in the art without departure from the spirit of the invention as described by the following claims.

What is claimed is:

1. An apparatus for manufacturing a seamless gasket, comprising:
   an annular die cavity having a central column that defines a groove in an exterior surface intermediate perspective distal ends of the column, a charge inlet in a perimeter wall, and a lower pusher movable from a first position to a second position in response to compressing a first charge of expanded intercalated graphite worms in the die cavity, the lower pusher in the first position defining a gap between a lower surface at the lower pusher and a bottom of the die cavity, and the lower pusher movable to a third position spaced from the bottom of the die cavity;

a flange extending laterally from the lower pusher at a bottom inner diameter edge thereof;

an o-ring received in the groove;

means for communicating expanded intercalated graphite worms from a source to the charge inlet in the annular die cavity for depositing a charge of expanded intercalated graphite worms within the die cavity;

a upper pusher movable from a first position distally spaced from an open end of the die cavity and a second position within the die cavity for compressing the charge of expanded intercalated graphite worms; and whereby the die cavity receives the first charge of expanded intercalated graphite worms which is compressed by the upper pusher while also moving the lower pusher to the second position so that the second charge of expanded intercalated graphite worms is received in substantially the same volume as a first charge and the flange is stopped by the o-ring when the lower pusher moves to a third position for removing the seamless gasket from the die cavity.

2. The apparatus as recited in claim 1, further comprising a supply plenum that communicates with the source of expanded intercalated graphite worms and a source of low pressure air, for carrying the expanded intercalated graphite worms into the die cavity.

3. The apparatus as recited in claim 2, wherein the source of low pressure air comprises an air chamber which communicates with the supply plenum; and an air nozzle disposed therein for pushing air towards the supply plenum.

4. The apparatus as recited in claim 3, further comprising an air permeable, expanded intercalated graphite worm impermeable screen separating the supply plenum and the air chamber.

5. The apparatus as recited in claim 1, further comprising a vacuum pump which communicates through a vent in the die cavity for pulling air therefrom while the die cavity receives the charges of expanded intercalated graphite worms.

6. The apparatus as recited in claim 5, further comprising a filter connected between the die cavity and the pump for collecting residual worms carried out of the die cavity.

7. An apparatus for manufacturing a seamless gasket, comprising:

an annular die cavity having a central column that defines a groove in an exterior surface intermediate perspective distal ends of the column, a charge inlet in a perimeter wall, and a lower pusher movable from a first position to a second position in response to compressing a first charge of expanded intercalated graphite worms in the die cavity, the lower pusher in the first position defining a gap between a lower surface at the lower pusher and a bottom of the die cavity, and the lower pusher movable to a third position spaced from the bottom of the die cavity;

a contacting surface that extends from the lower pusher at a bottom inner diameter edge thereof;

a seal ring received in the groove;

means for communicating expanded intercalated graphite worms from a source to the charge inlet in the annular die cavity for depositing a charge of expanded intercalated graphite worms within the die cavity;

a upper pusher movable from a first position distally spaced from an open end of the die cavity and a second position within the die cavity for compressing the charge of expanded intercalated graphite worms; and whereby the die cavity receives the first charge of expanded intercalated graphite worms which is compressed by the upper pusher while also moving the lower pusher to the second position so that a second charge of expanded intercalated graphite worms is received in substantially the same volume as the first charge and the lower pusher is stopped by the contacting surface contacting the seal ring when the lower pusher moves to a third position for removing the seamless gasket from the die cavity.

8. The apparatus as recited in claim 7, further comprising a supply plenum that communicates with the source of expanded intercalated graphite worms and a source of low pressure air, for carrying the expanded intercalated graphite worms into the die cavity.

9. The apparatus as recited in claim 8, wherein the source of low pressure air comprises an air chamber which communicates with the supply plenum; and an air nozzle disposed therein for pushing air towards the supply plenum.

10. The apparatus as recited in claim 9, further comprising an air permeable, expanded intercalated graphite worm impermeable screen separating the supply plenum and the air chamber.

11. The apparatus as recited in claim 7, further comprising a vacuum pump which communicates through a vent in the die cavity for pulling air therefrom while the die cavity receives the charges of expanded intercalated graphite worms.

12. The apparatus as recited in claim 11, further comprising a filter connected between the die cavity and the pump for collecting residual worms carried out of the die cavity.

13. An apparatus for manufacturing a seamless gasket, comprising:

an annular die cavity having a central column that defines a groove in an exterior surface intermediate perspective distal ends of the column, a charge inlet in a perimeter wall, and a lower pusher movable from a first position to a second position in response to compressing a first charge of expanded intercalated graphite worms in the die cavity, the lower pusher in the first position defining a gap between a lower surface at the lower pusher and a bottom of the die cavity, and the lower pusher movable to a third position spaced from the bottom of the die cavity;

a contacter that extends from the lower pusher at a bottom inner diameter edge thereof;

an extending ring received in the groove;

a communicator that moves expanded intercalated graphite worms from a source to the charge inlet in the annular die cavity for depositing a charge of expanded intercalated graphite worms within the die cavity;

a upper pusher movable from a first position distally spaced from an open end of the die cavity and a second position within the die cavity for compressing the charge of expanded intercalated graphite worms; and whereby the die cavity receives the first charge of expanded intercalated graphite worms which is compressed by the upper pusher while also moving the lower pusher to the second position so that a second charge of expanded intercalated graphite worms is received in substantially the same volume as the first charge and the lower pusher is stopped by the contactor contacting the extending ring when the lower pusher moves to a third position for removing the seamless gasket from the die cavity.

14. The apparatus as recited in claim 13, wherein the communicator further comprises a supply plenum that communicates with the source of expanded intercalated graphite worms and a source of low pressure air, for carrying the expanded intercalated graphite worms into the die cavity.

15. The apparatus as recited in claim 14, further comprising a metering device to control the flow of expanded intercalated graphite worms from the source into the supple plenum.

16. The apparatus as recited in claim 14, wherein the source of low pressure air comprises an air chamber that communicates with the supply plenum; and another air nozzle disposed therein for pushing air towards the supply plenum to mix the expanded intercalated graphite worms therein.

17. The apparatus as recited in claim 16, further comprising an air permeable, expanded intercalated graphite worm impermeable screen separating the supply plenum and the air chamber.

18. The apparatus as recited in claim 13, further comprising a vacuum pump which communicates through a vent in the die cavity for pulling air therefrom while the die cavity receives the charges of expanded intercalated graphite worms.

19. The apparatus as recited in claim 17, further comprising a filter connected between the die cavity and the pump for collecting residual worms carried out of the die cavity.

\* \* \* \* \*